3,477,955
CARBON DIOXIDE GENERATING COMPOSITIONS
Ralph H. Hiltz, Pittsburgh, Pa., assignor to Mine Safety Appliances Company, Pittsburgh, Pa., a corporation of Pennsylvania
No Drawing. Filed Jan. 16, 1967, Ser. No. 609,356
Int. Cl. A62d *1/00;* C01b *31/20*
U.S. Cl. 252—4                        10 Claims

ABSTRACT OF THE DISCLOSURE

An autogenously combustible composition for producing carbon dioxide containing an alkali or alkaline earth metal peroxide or superoxide and an alkaline earth metal or aluminum carbide and, if desired, a thermally dissociable inorganic carbonate or boric oxide.

---

This invention relates to compositions for producing carbon dioxide and more particularly to combustible compositions that on burning liberate carbon dioxide.

The compositions of this invention are autogenously combustible, that is, the combustion if self-sustained once the compositions are ignited. In this respect, the compositions are similar to the well-known chlorate candle for producing oxygen and the compositions of this invention are generally used in the same manner to produce carbon dioxide as oxygen candles are used to produce oxygen. The compositions are placed in a container with suitable outlets and ignition means, are ignited, and as combustion proceeds the produced carbon dioxide is discharged from the container. Ignition can be accomplished by conventional ignition devices, such as an electric match, hot wire or a solid chemical heat source.

The new compositions consist of an intimate mixture of finely divided components that are compressed to form a coherent compact. The essential components are an alkali or alkaline earth metal peroxide or superoxide and an alkaline earth metal or light metal carbide that exothermically react to produce carbon dioxide according to the equations:

(1)     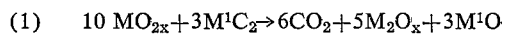

or (2)     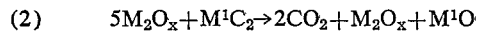

where M is an alkali or alkaline earth metal, $x$ is the valence of M, and $M^1$ is an alkaline earth metal.

In addition, the compositions may contain an inorganic carbonate that endothermically thermally dissociates, the appropriate amount depending on the thermal dissociation temperature of the specific carbonate used.

Preferred compositions also contain a minor amount of boric oxide.

Suitable peroxy components include the alkali metal peroxides, for example, lithium peroxide, $Li_2O_2$; potassium peroxide, $K_2O_2$; and sodium peroxide, $Na_2O_2$; alkali metal superoxides, for example, sodium superoxide, $NaO_2$, and potassium superoxide, $KO_2$; alkaline earth metal peroxides, for example, calcium peroxide, $CaO_2$, and barium peroxide, $BaO_2$; and alkaline earth metal superoxides, for example, calcium superoxide, $CaO_4$.

Sodium or potassium superoxide are preferred because of their high oxygen content. Sodium or calcium peroxide are preferred for applications where it is desired to produce $CO_2$ at the lowest cost and a lower production of $CO_2$ per unit weight of combustible composition is permissible. The peroxy materials may be in powdered or granular form, or, in the case of $KO_2$ and $Na_2O_2$ in the form of a fluff formed when they are made by spraying the metal in air according to the method of Jackson, U.S. Patent No. 2,405,580.

Suitable carbides include alkaline earth metal carbides, for example, calcium carbide, $CaC_2$, magnesium carbide, $MgC_2$, and barium carbide, $BaC_2$; and light metal carbides such as aluminum carbide, $Al_4C_3$. Calcium carbide is preferred because of its low cost and high carbon content. The carbides may be powdered, granular or in any other finely divided form.

Any inorganic carbonate that thermally dissociates without melting may be used, such as, for example, magnesium carbonate, calcium carbonate, cesium carbonate, rubidium carbonate, cobalt carbonate, nickel carbonate and zinc carbonate. Magnesium carbonate is preferred as it has a high carbon dioxide content and dissociates at a low temperature.

Preferably the peroxy components and carbides are used in stoichiometric proportions to realize the highest yield of carbon dioxide. Proportions other than stoichiometric may be used, but there is no benefit in so doing. Compositions containing only peroxy materials and carbides burn, when ignited, quite rapidly and at a high temperature to rapidly produce carbon dioxide.

The reaction rate and temperature can be moderated by including in the composition a thermally dissociable inorganic carbonate; the endothermic dissociation absorbs and utilizes heat from the exothermic peroxy-carbide reaction, thereby both reducing the reaction rate and temperature and producing carbon dioxide. The amount of carbonate that can be incorporated in the compositions without impairing the autogenous combustion is a function of the thermal dissociation temperature of the carbonate; the dissociation temperature must not exceed the combustion temperature of the composition containing the carbonate. Suitably, carbonates that dissociate at temperatures of about 300–400° C. can be added in amounts up to that which produces 1 mol of $CO_2$ for each mol of $CO_2$ produced by the peroxy-carbide reaction, and carbonates that dissociate at about 800° C. can be added in amounts up to that which produce about ¼ mol of $CO_2$ for each mol of $CO_2$ produced by the peroxy-carbide reaction. The carbonates may be powdered, crystalline or in other finely divided form.

It is essential that the compositons be water-free so none of the components can contan absorbed water or water of hydration and the compositions must be protected from exposure to atmospheric water vapor during periods of storage. Water will react with the peroxy compounds to form oxygen and with the carbides to form acetylene, even though slowly, to form possible explosive mixtures. The materials are, of course, mixed, compressed and packaged in dry atmospheres.

Some components contain impurities that decompose at combustion temperatures to release water, e.g., commercial calcium carbide contains considerable slaked lime, $Ca(OH)_2$. Such impurities do not adversely affect the storage of the compositions but will, on ignition, result in the formation of a flame of short duration that may be undesirable in some applications. When using commercial grade calcium carbide it is preferred to decompose the slaked lime by vacuum heating at high temperatures, e.g., 1000° F. and then break the vacuum with a $CO_2$ atmosphere to convert the slaked lime to calcium carbonate. When using components substantially free of impurities that do not yield water at combustion temperatures, the compositions burn with a flameless burning front traveling from the point of ignition.

In small pellets, on the order of 10 grams, the peroxy-carbide compositions, with or without added carbonate, will liberate up to about 95% yield carbon dioxide. The yield in larger compacts, 100 grams to several pounds or larger, the $CO_2$ yield is much lower, about 60%, due to the reabsorption of carbon dioxide by already combusted portions of the compact. The reabsorption loss is greatly reduced by incorporating a minor amount of boric oxide in the compositions, which converts the solid reaction products from crystalline carbon dioxide absorbents to glassy components that do not absorb carbon dioxide. The incorporation of 5–10% by weight boric acid gives carbon dioxide yields of 70–80%. Larger amounts of boric oxide may be used, up to 20% or more, which may further increase the yield slightly, but at the expense of the amount of $CO_2$ produced per unit weight of combustible composition.

The pressures required to compress the materials into a coherent compact vary depending on the particular components selected, but generally pressures between about 12,000 and 20,000 p.s.i.g. are suitable.

The following examples are illustrative of this invention:

Example 1

Commercial granular calcium carbide was heated under vacuum for two hours at 800° F. to decompose the slaked lime impurity. The vacuum was broken by the addition of $CO_2$, converting the impurity to calcium carbonate. 2.8 grams of the pretreated carbide (75% $CaC_2$) and 7.9 grams of $KO_2$ fluff were mixed and compressed at 15,000 p.s.i.g. to form a coherent pellet. When the pellet was ignited by electric match and a $BaCrO_4$-Zr heat charge 1.41 liters (STP) of substantially pure $CO_2$ was rapidly liberated, which is 0.13 liter per gram of combustible composition.

Example 2

Example 1 was repeated except 28 grams of pretreated carbide and 79 grams of $KO_2$ were used. On ignition, the compact burned with a burning front traveling at about four inches per minute to liberate 9.5 liters of $CO_2$, or 0.09 liter per gram of combustible composition.

Example 3

An intimate mixture of 28 grams of pretreated carbide, 79 grams of $KO_2$ and 85 grams of $MgCO_3$ was compressed at 15,000 p.s.i.g. to form a coherent body which, when ignited, burned at a rate of about two inches per minute to liberate 17.3 liters of $CO_2$, or 0.09 liter/gram of combustible composition.

Example 4

An intimate mixture of 75 grams of pretreated calcium carbide, 210 grams of $KO_2$, 150 grams of $MgCO_3$ and 18 grams of $B_2O_3$ was pressed at 15,000 p.s.i.g. to form a coherent body that on ignition, burned at a rate of about two inches per minute to liberate 1.7 cubic feet of $CO_2$ or 0.11 liter/gram of combustible composition.

Compositions in which other peroxy components, carbides or carbonates are used burn substantially the same as in the foregoing examples, except that compositions containing lithium peroxide burn at about 25% slower rate.

The compositions of this invention are especially useful for providing carbon dioxide in portable devices such as fire extinguishers, inert gas blankets, and other fire fighting or suppressing apparatus.

I claim:
1. An autogenously combustible composition that liberates carbon dioxide on burning consisting essentially of a consolidated body having substantially uniformly distributed therethrough an oxide selected from the group consisting of alkali metal peroxides, alkali metal superoxides, alkaline earth metal peroxides and alkaline earth metal superoxides and a carbide selected from the group consisting of alkaline earth metal carbides and aluminum carbide.

2. A composition in accordance with claim 1 containing substantially uniformly distributed therethrough an inorganic carbonate that thermally dissociates without melting at a temperature below the combustion temperature of the composition.

3. A composition according to claim 2 in which the carbonate is magnesium carbonate.

4. A composition according to claim 1 containing between about 5–10% by weight of boric oxide.

5. A composition according to claim 1 in which the components are in substantially stoichiometric proportions.

6. A composition according to claim 4 containing substantially uniformly distributed therethrough an inorganic carbonate that thermally dissociates without melting at a temperature below the combustion temperature of the composition.

7. A composition according to claim 2 containing potassium superoxide, calcium carbide and a carbonate having a dissociation temperature below about 400° C. in the proportions of about ⅓ mol of calcium carbide and ⅔ mol of carbonate for each mol of potassium superoxide.

8. A composition according to claim 7 in which the carbonate is magnesium carbonate.

9. A composition according to claim 8 which contains between about 5–10% boric oxide.

10. A composition according to claim 2 consisting essentially of potassium superoxide, calcium carbide, and a carbonate having a dissociation temperature below about 800° C. in the proportions of about ⅓ mol of calcium carbide and about ⅙ mol of carbonate for each mol of potassium superoxide.

References Cited

UNITED STATES PATENTS

| 1,863,157 | 6/1932 | Geere | 52—88.3 XR |
| 3,348,922 | 10/1967 | Bose et al. | 23—150 XR |

MAYER WEINBLATT, Primary Examiner

U.S. Cl. X.R.

23—150; 252—181.4, 182, 184, 188.3, 192